April 28, 1959
E. C. PYLE ET AL
2,884,230
PNEUMATIC BLENDER
Filed Nov. 18, 1955
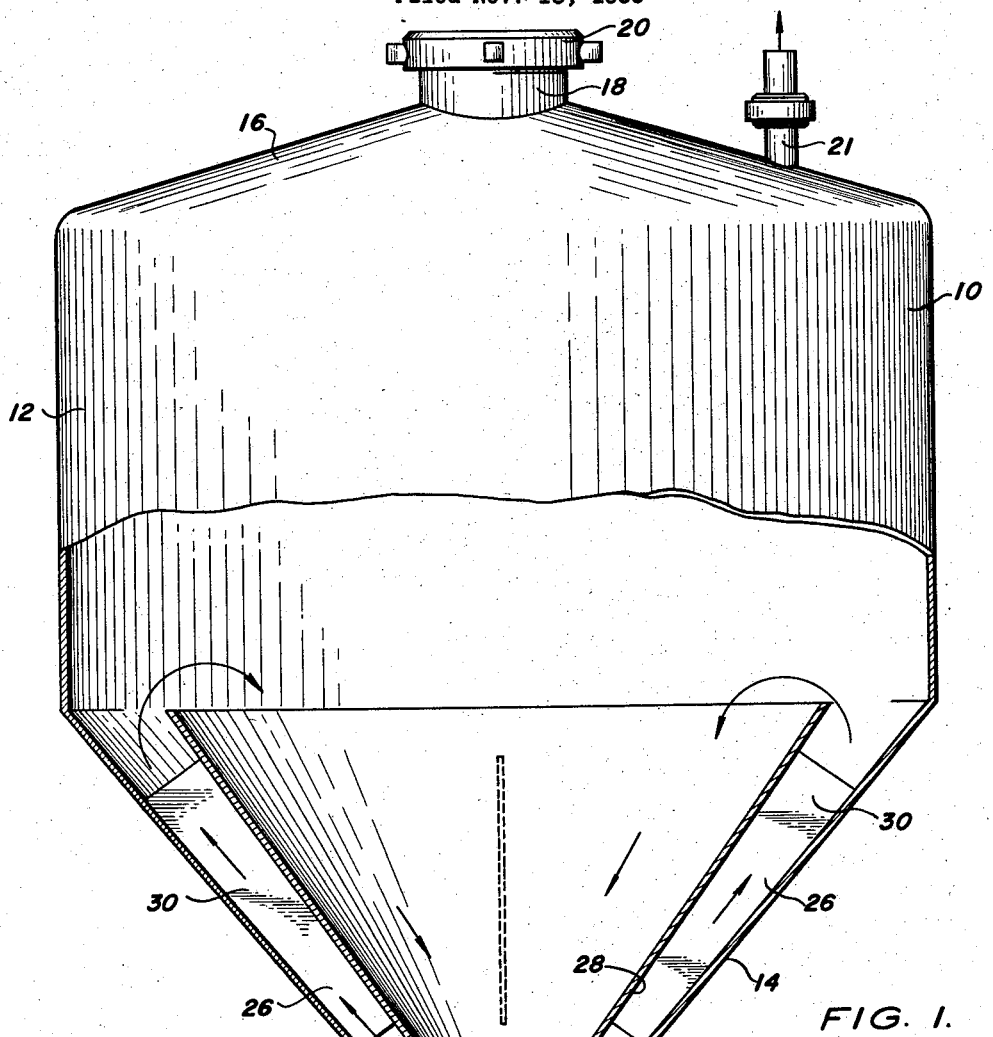
FIG. 1.
FIG. 2.
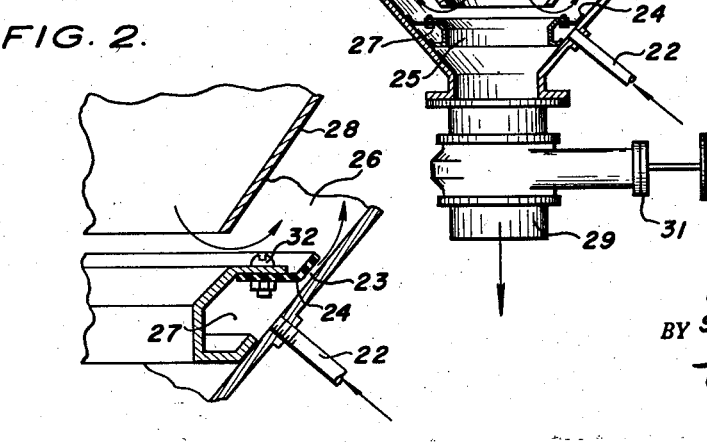
INVENTORS.
Edwin C. Pyle,
BY Samuel S. Northington.
Earl Babcock,
ATTORNEY.

United States Patent Office 2,884,230
Patented Apr. 28, 1959

2,884,230

PNEUMATIC BLENDER

Edwin C. Pyle and Samuel S. Northington, Duncan, Okla., assignors to Halliburton Oil Well Cementing Company, Duncan, Okla.

Application November 18, 1955, Serial No. 547,618

6 Claims. (Cl. 259—4)

This invention relates to an apparatus employed in the pneumatic blending of pulverulent materials of different characteristics and densities, in order to effect a complete and homogeneous mixture of such pulverulent materials.

In many operations and more especially in oil well servicing, complete, uniform and homogeneous mixtures of pulverulent materials are required to meet very close and exacting tolerances, so that the resulting mixtures will have the desired characteristics for the particular operation.

Therefore, it is an object of this invention to provide an improved apparatus for use in the pneumatic blending of pulverulent materials, which is simple in construction, and which in operation is efficient in obtaining homogeneous mixtures that meet the requirements of any particular employment of such materials.

Other objects and advantages of the invention will become apparent from the following description, when taken in connection with the accompanying drawing, in which:

Figure 1 is a sectional view in elevation of an apparatus for circulating pulverulent materials and embodying the present invention.

Figure 2 is an enlarged, fragmentary, sectional view of a valve and ring used in the arrangement of Fig. 1.

Although the invention is adapted for use in connection with various forms of receptacles or containers, it is herein illustrated in connection with a container 10, having a cylindrical upper section 12. The cylindrical upper section 12 has a dome like top 16, having a filling opening 18 with a closure 20. The container 10 may be vented through the closure 20 or through an auxiliary vent 21.

In accordance with the invention, an inverted truncated cone 14 is secured to the bottom of the cylindrical section 12. At the base of the inverted truncated cone 14 one or more air inlets 22 are provided. These are adapted to introduce air into container 10 for blending the pulverulent materials, by means of a specially provided ring assembly 25 in combination with a check and air distribution valve 24.

A preferred construction of the ring assembly 25 is illustrated in Figure 2. The bottom of the ring assembly 25 is secured to the base of cone 14, thereby providing an annular air distribution chamber 27 and an annular air distribution aperture 23. The size of aperture 23 is critical. It must be constructed, so that air passing through, strikes cone walls 28 and 14 upwardly. As illustrated in Figure 2, the check and air distribution valve 24 is a flapper type ring of resilient material fastened to ring assembly 25 by any suitable means 32. Air entering through inlet 22 is distributed throughout annular chamber 27, passes through annular aperture 23, thereby deflecting valve 24 upwards, and permitting the air to pass through annular passage 26. When the air is cut off, valve 24 falls, sealing aperture 23 and chamber 27.

Annular passage 26 provides for flow of air and pulverulent materials upwardly. Said annular passage 26 is formed by a hollow cone 28 being inwardly attached by supports 30 to cone 14. Annular passage 26 increases in cross section upwardly by having the interior angle of hollow cone 28 smaller than the interior angle of cone 14. This arrangement permits the upwardly flowing air and pulverulent materials to expand. The supports 30 are vanes which may be of curved design in order to impart turbulence to the upwardly flowing air and pulverulent materials. It is not necessary to the successful operation of the invention that said supports 30 be vanes, however.

Container 10 is provided with any suitable means, such as conduit 29 and valve 31, to discharge the pulverulent materials after they are blended.

The operation of the invention shown in Figures 1 and 2 is illustrated as follows:

The container 10 is charged with the pulverulent materials to be blended, such as cement, gel, retarder, and pozzuolana, through opening 18, or by any other suitable charging means. Closure 20 may be left open, or may be closed and be provided with a vent means. Other suitable vent means 21 may be provided.

Discharge means 29 is closed by valve 31 and a gas, preferably air, under sufficient pressure is introduced at air inlet means 22 into annular air distribution chamber 27. The pressure causes flapper valve 24 to deflect upwardly, opening annular aperture 23. Hollow cone 28 is so placed that the air will be deflected upwardly into annular passage 26, thereby aerating and causing the pulverulent materials to flow upwardly. It is known in the art that aerated pulverulent materials assume the properties of liquids and have a tendency to flow. The present invention is a practical application of this characteristic. When the air stream causes the pulverulent materials to flow out of the annular passage 26, the jet action of the air stream creates suction or even a partial vacuum behind it and continuously draws the pulverulent materials from hollow cone 28 into annular passage 26. The aerated pulverulent materials flowing over the top of hollow cone 28, continue upward into cylinder 12. The air separates out and is exhausted through the vents provided. The pulverulent materials tumble downward into hollow cone 28 in a circular gyratory motion, thereby effecting a homogeneous blend.

After the homogeneous blend is obtained, the air at inlet 22 is shut off. The valve 24 then closes and prevents the blended materials from falling into and clogging chamber 27 and inlets 22.

The blended material may remain in container 10 for storage or it may be removed for use through the discharge means provided.

It is to be noted that flapper valve 24 is not necessary to the successful operation of the invention.

Having described fully the structure and operation of the invention, will be understood that various changes may be made without departing from the spirit of the invention or the scope of the annexed claims.

For example, it is within the purview of the invention to provide the annular passage 26 with a number of additional spaced ring assemblies 25 and inlets 22 with their associated parts, to assist in creating the desired upward flow through the passage 26.

We claim:

1. A material blending apparatus comprising a container, means for supplying pulverulent material to said container to be blended therein, an outside cone shaped wall secured to the bottom of said container, a hollow inside cone shaped wall open at both ends and located in said outside wall, means for attaching said hollow inside wall to said outside wall to form an annular passageway therebetween, and ring assembly means for directing air into the bottom of the passageway so formed, the arrangement being such that when air enters the passageway, the pulverulent material is caused to flow upwardly therethrough with considerable turbulence and downwardly through said inside wall with circular gyratory motion to intimately mix the materials.

2. A material blending apparatus comprising a container, means for supplying pulverulent material to said container to be blended therein, an outside cone shaped wall secured to the bottom of said container, a hollow inside cone shaped wall open at both ends located in said outside wall, means for attaching said hollow inside wall to said outside wall to form an annular passageway therebetween, and means for directing air into the bottom of the passageway so formed, said means comprising an air inlet, a ring assembly secured to lower section of said outer wall so as to form an annular air distribution chamber and an annular air distribution aperture, whereby the air passes into said passageway, causing the pulverulent material to flow upwardly therethrough with considerable turbulence and downwardly through said inside wall with circular gyratory motion to intimately mix the materials.

3. A material blending apparatus comprising a container, means for supplying pulverulent material to said container to be blended therein, an outside cone shaped wall secured to the bottom of said container, a hollow inside cone shaped wall open at both ends located in said outside wall, means for attaching said hollow inside wall to said outside wall to form an annular passageway therebetween, and ring assembly means for directing air into the bottom of the passageway so formed, said annular passageway being so constructed that it diverges upwardly, thereby permitting the upwardly flowing air and pulverulent materials to expand with considerable turbulence.

4. A material blending apparatus comprising a container, means for supplying pulverulent material to said container to be blended therein, an outside cone shaped wall secured to the bottom of said container, a hollow inside cone shaped wall open at both ends located in said outside wall, means for attaching said hollow inside wall to said outside wall to form an annular passageway therebetween, said attaching means including vanes, and means for directing air into the bottom of the passageway so formed, the arrangement of the vanes in the annular passageway being such that when air enters the passageway, the pulverulent material is caused to flow upwardly therethrough with considerable turbulence and downwardly through said inside wall with circular gyratory motion to intimately mix the materials.

5. A material blending apparatus comprising, a container, means for supplying pulverulent material to said container to be blended therein, a downwardly converging outside wall member secured to the bottom of said container, a hollow downwardly converging inside wall member positioned in said outside wall member, said hollow inside wall member being open at both ends, means for attaching said hollow inside wall member in spaced relationship to said outside wall member to form an annular passageway therebetween, and air distribution means secured to the base of said outside wall, said air distribution means being adapted to flow air and the said pulverulent materials upwardly in said annular passageway, the arrangement being such that when air enters the passageway, the pulverulent material is caused to flow upwardly therethrough with considerable turbulence and downwardly through said inside wall member with circular gyratory motion to intimately mix the materials.

6. A material blending apparatus as defined in claim 5 wherein the air distribution means comprises, in combination, an annular ring attached to said downwardly converging outside wall near the base thereof, the upper portion of said annular ring defining an aperture with said outside wall, and valve means adapted to open and close said aperture.

References Cited in the file of this patent

UNITED STATES PATENTS

| | | |
|---|---|---|
| 465,013 | Bourdil | Dec. 15, 1891 |
| 828,274 | Cornish | Aug. 7, 1906 |
| 1,526,170 | Milligan | Feb. 10, 1925 |
| 1,601,727 | Faragher et al. | Oct. 5, 1926 |
| 2,255,438 | Robinson | Sept. 9, 1941 |
| 2,360,344 | Hilkemeier | Oct. 17, 1944 |
| 2,400,194 | Day et al. | May 14, 1946 |
| 2,413,488 | Draeger | Dec. 31, 1946 |
| 2,461,746 | Lathrop et al. | Feb. 15, 1949 |
| 2,611,685 | Yoder | Sept. 23, 1952 |
| 2,635,952 | D'Ouville | Apr. 21, 1953 |
| 2,698,281 | Leffer | Dec. 28, 1954 |
| 2,723,838 | Peters | Nov. 15, 1955 |

FOREIGN PATENTS

| | | |
|---|---|---|
| 922,155 | Germany | Jan. 10, 1955 |